May 23, 1972     C. E. ELLIS     3,664,704
INTEGRATED ACCESSORY GROUP FOR PICK-UP TRUCKS
Filed Dec. 15, 1970     2 Sheets-Sheet 1
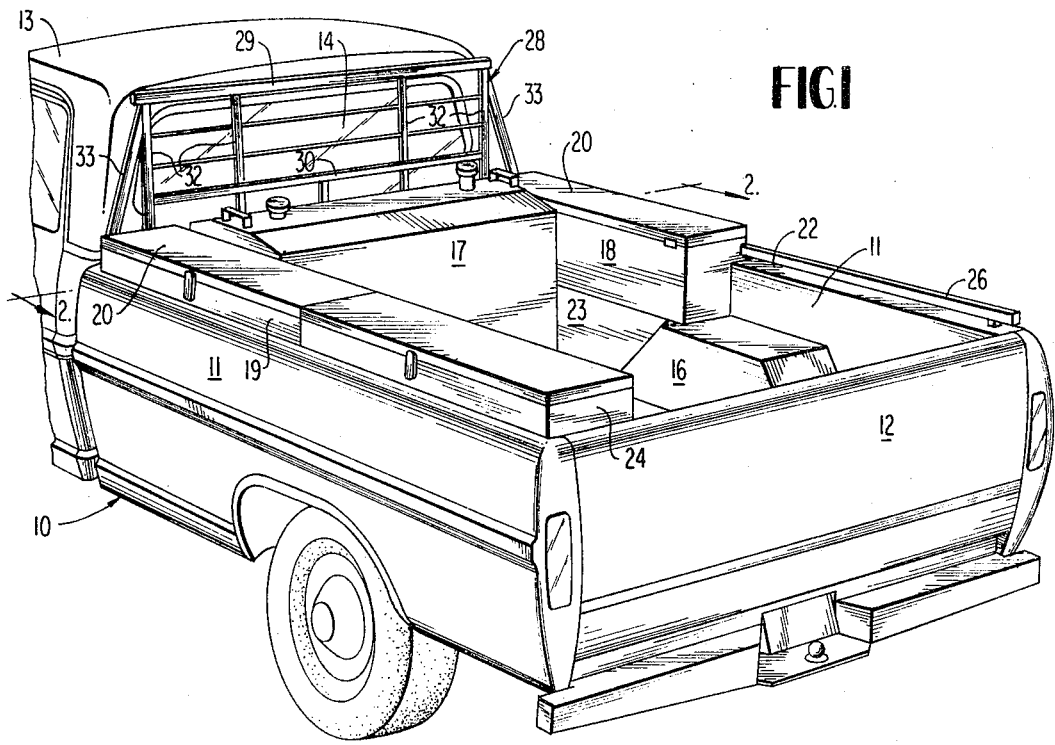
FIG.1
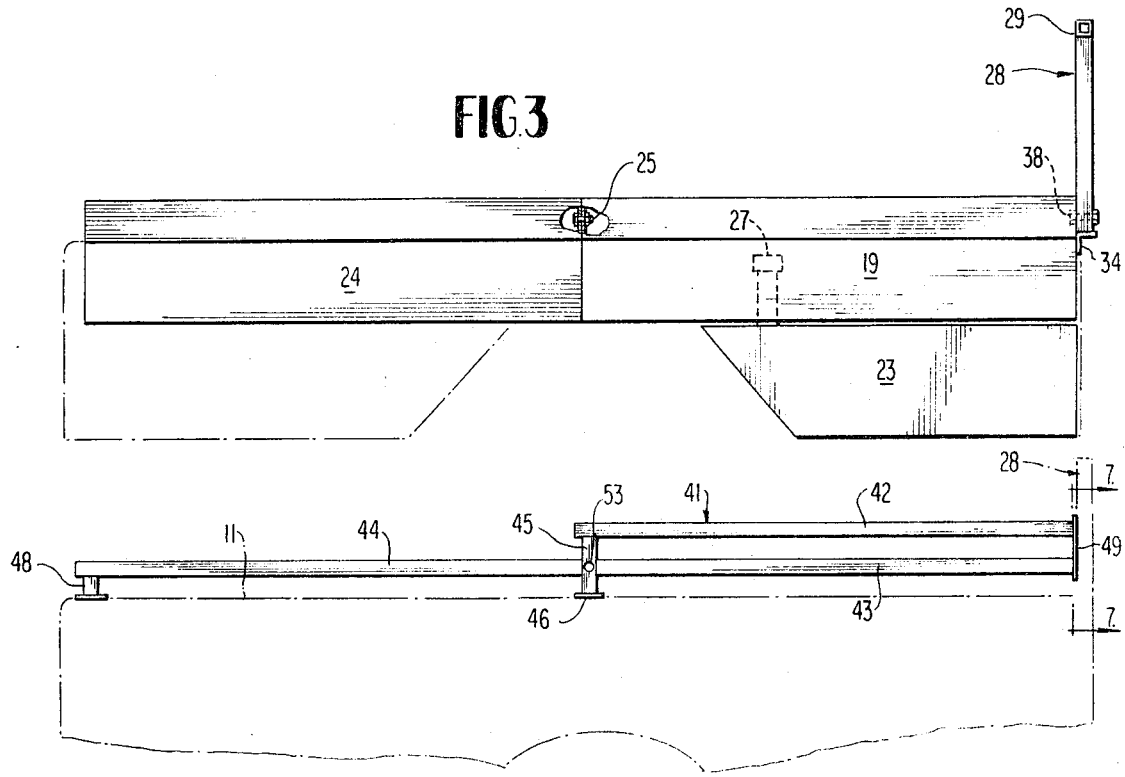
FIG.3
FIG.4

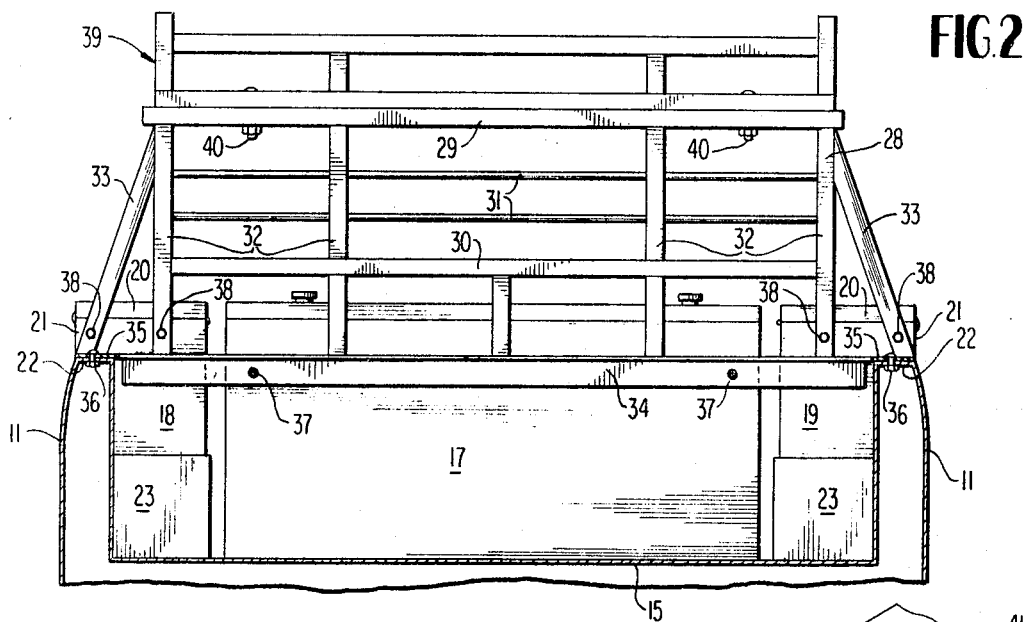
FIG.2
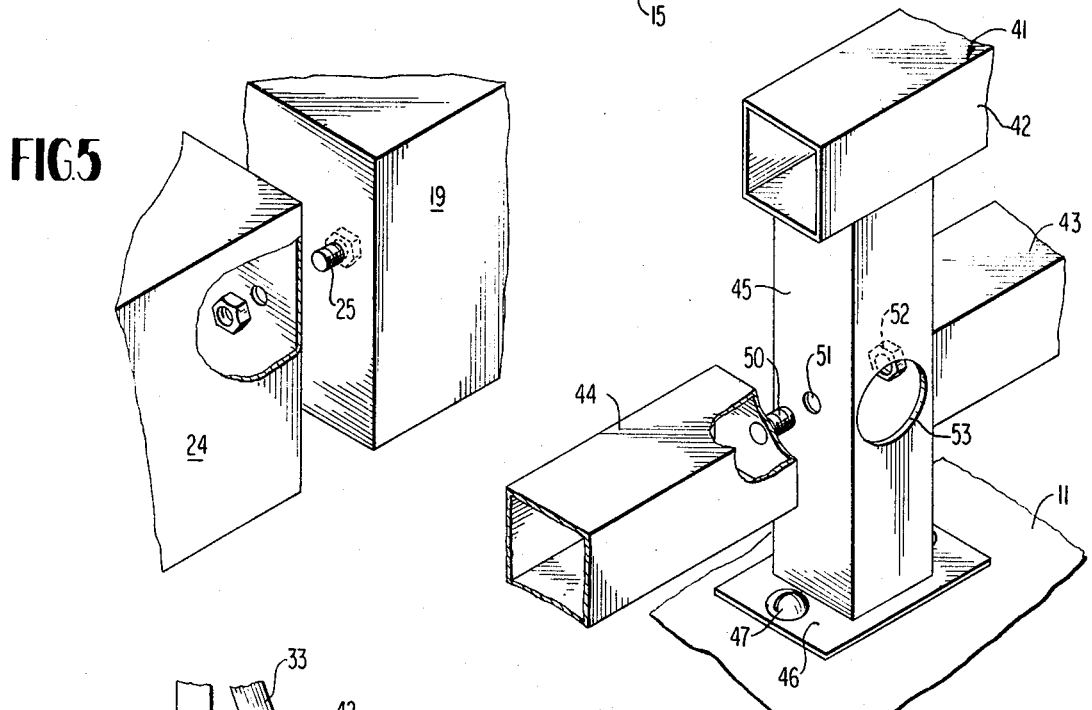
FIG.5
FIG.6
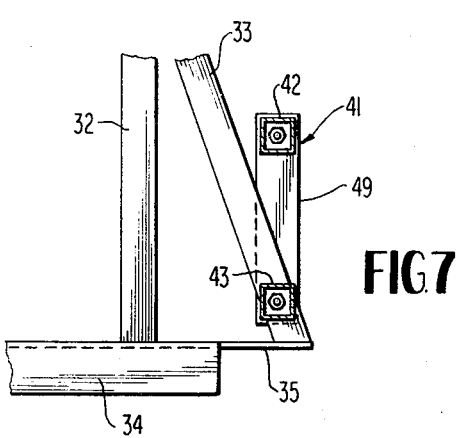
FIG.7

United States Patent Office 3,664,704
Patented May 23, 1972

3,664,704
INTEGRATED ACCESSORY GROUP FOR PICK-UP TRUCKS
Clarence E. Ellis, P.O. Box 6, Red Rock, Okla. 74651
Filed Dec. 15, 1970, Ser. No. 98,358
Int. Cl. B60r 7/00
U.S. Cl. 296—24 R                    7 Claims

ABSTRACT OF THE DISCLOSURE

Tool boxes, storage tanks, a cab protecting rack and other accessory units are arranged compactly in the pick-up truck body and tied together so that the accessory components will not shift. The arrangement is neat and compact and does not result in a loss of truck bed length or accessibility. Space sometimes wasted fore and aft of wheel wells is utilized to advantage.

Various accessory components including tool boxes and the like are known for use on pick-up trucks. In general conventional accessories for this purpose are furnished by different manufacturers with no orderly or integrated scheme in mind. Consequently when the accessories are used they do not fit in a particular manner in the truck body and space is wasted and the resulting arrangement tends to be clumsy and inefficient.

The objective of this invention is to furnish an integrated system of accessory components for pick-up truck bodies which are tailored to utilize the minimum possible space in the truck body while providing maximum convenience and usefulness in the storage of tools, fuels and the like. The accessory components are tied together and anchored to the truck body in such a way that undesirable shifting or displacement of components is eliminated. A protective rack or barrier for the rear cab window is provided including a detachable extension and side rails add to the effective height of the truck body sides when required. The various components of the invention are easy to install and remove, do not require modification of the conventional truck body, and do not detract from its general utility.

BRIEF DESCRIPTION OF DRAWING FIGURES

FIG. 1 is a rear prospective view of a pick-up truck equipped with accessory components according to the invention.

FIG. 2 is a transverse vertical section taken on line 2—2 of FIG. 1.

FIG. 3 is a side elevational view of the accessory components at one side of the truck body.

FIG. 4 is a similar view of a modification.

FIG. 5 is an enlarged fragmentary exploded prospective view of a connection between adjacent components.

FIG. 6 is a similar view showing a side rail connection.

FIG. 7 is an enlarged fragmentary vertical section taken on line 7—7 of FIG. 4.

DETAILED DESCRIPTION

Referring to the drawings in detail, wherein like numerals designate like parts throughout, the numeral 10 designates a conventional pick-up truck having a load body including side walls 11 and a vertically swinging tailgate 12. The truck has the usual closed cab 13 with rear window 14. The bed or deck 15 of the truck body is interrupted on opposite sides by wheel wells 16 in a conventional manner.

The accessory components forming the subject matter of the invention may include, as depicted in FIGS. 1 and 2 a relatively large transversely elongated fuel storage tank 17 immediately rearwardly of the cab 13 and extending somewhat above the open top of the truck body. On opposite sides of the storage tank 17 in back to back relationship with the ends of the tank are tool boxes 18 and 19 having hinged lids 20, provided with conventional latches and other hardware. As best shown in FIG. 2 the tool boxes 18 and 19 are generally L-shaped in cross-section so that their outer top portions 21 engage over and rest upon the top edges 22 of the truck body side walls 11. The boxes 18 and 19 are elongated lengthwise of the side walls 11 and their bottoms at their rear end portions rest upon the tops of the wheel wells 16 for stability.

Beneath the tool boxes 18 and 19 on one or both sides of the truck and immediately beyond the ends of the storage tank 17 are relatively small auxiliary tanks 23 for fuel or other liquid. These auxiliary tanks 23 rest squarely upon the truck bed 15 and against the side walls 11 and they underlie the tool boxes 18 and 19 and effectively support the same.

Rearwardly of the tool boxes 18 and 19 in the truck body, there is sufficient space on each side for an additional tool box or storage box 24 of the same configuration as the previously described boxes. One such box 24 is shown installed on the truck in FIG. 1 at the left hand side of the truck body. For additional security FIGS. 3 and 5 the abutting end walls of the boxes 19 and 24 are bolted together as indicated at 25.

If a rear tool box 24 is employed on one side only of the truck body, as shown in FIG. 1, a side tie rail 26 may be mounted on top of the opposite truck body wall 11 with its forward end bolted to the rear end of tool box 18 and its rear end securely anchored to the adjacent side wall 11. This tie rail 26 prevents rearward slippage of the tool box 18 and thus stabilizes the entire assemblage. The tool box 24 on the opposite side extends back to the tailgate 12 and is retained in place lengthwise effectively by the tailgate. Additionally the portions of the tool boxes which lie over the top edges 22 of the truck body sides may be bolted to these top edges at spaced intervals. Filler pipes 27 for the tanks 23 may project upwardly through openings provided in the tool boxes 18 and 19.

Another important component of the invention comprises a vertical cab protecting rack 28 which is anchored to the side walls 11 immediately rearwardly of the cab 13 and its rear window 14. This rack is constructed of sturdy materials and includes rectangular tubular cross bars 29 and 30 and intervening solid bars 31, all secured by welding or the like to vertical bars 32, also preferably formed from rectangular tubing. Heavy diagonal braces 33 are provided at the opposite ends of the rack and the bottoms of all of the vertical bars 32 are anchored firmly to a horizontal transverse angle bar 34. The transverse bar 34 spans the entire truck body transversely and includes end flanges 35 which rest upon the top edges 22 of side walls 11 and are bolted thereto as at 36. Additionally the bar 34 is bolted at 37 to the adjacent front vertical wall of the truck body. Additional bolts 38 are provided to anchor the vertical rack 28 to the adjacent ends of tool boxes 18 and 19.

If required in some instances a separate detachable rack extension 39, about six inches high may be bolted at 40 to the top of the main rack 28. The rack extension 39 is shown installed in FIG. 2 only.

In some instances, in lieu of the tool boxes 18, 19 and 24 it may be desirable to employ side rails on top of the truck body side walls 11, as indicated in FIG. 4 and FIGS. 6 and 7. In these figures a side rail assembly 41 comprises forward upper and lower bars 42 and 43 and a rear lower bar 44. A post 45 near the longitudinal of the truck body has a base plate 46, secured at 47 to the top of the adjacent side wall 11 of the truck body. A shorter post 48 on the rear of bar 44 is similarly secured to the side wall 11. The forward ends of the bars 42 and 43 are secured to a vertical plate 49, which in turn is rigidly anchored to the vertical rack 28 by bolting. The forward end of the rear bar 44 carries a threaded stud 50 engaging through an opening 51 in the post 45 and receiving a nut 52 inside of this post, made accessible through an opening 53 formed in the side of the post 45.

It may now be seen that the invention provides an integrated or unitized assemblage of accessory components which may be easily installed on the pick-up truck body in a variety of arrangements. Maximum flexibility is thus accorded. The individual components are stabilized so that they will not shift on the truck body and maxiuse of sometimes unused space is achieved. The major useable portion of the truck bed or deck remains unobstructed. It is thought that the advantages of the invention will be apparent to those skilled in the art without further description herein.

It is to be understood that the form of the invention herewith shown and described, is to be taken as a preferred example of the same, and that various changes in the shape, size and arrangement of parts may be resorted to, without departing from the spirit of the invention or the scope of the subjoined claims.

I claim:

1. In a truck, an open box-like body having a bed, side walls, a rear tailgate, and a cab structure at the front of the box-like body and a pair of wheel wells projecting inwardly from the side walls and upwardly from the bed, the improvement comprising a storage tank resting on the bed immediately rearwardly of the cab and being transversely elongated and having its ends spaced from the side walls of the body, auxiliary tanks disposed between the ends of said storage tank and said side walls and between said cab and wheel wells and having their tops spaced below the tops of the side walls, and at least one tool box immediately inwardly of each side wall and resting upon the auxiliary tanks and engaging between the side walls and the ends of the storage tank and being elongated longitudinally of the side walls, said tool boxes being L-shaped in cross-section and having outer lateral extensions overlying the tops of the side walls and secured thereto.

2. The structure of claim 1 and a vertical protective rack disposed immediately rearwardly of the cab and extending transversely thereacross and having lower corners anchored to said side walls, and bolt means anchoring said rack at least to the forward ends of said tool boxes.

3. The structure of claim 1 and plural tool boxes extending along at least one side wall of the truck body substantially for its full length, and bolt means interconnecting said tool boxes in end-to-end abutting relationship.

4. The structure of claim 1 and a single tool box adjacent to one side wall at the forward end thereof, and a tie bar anchored to said side wall rearwardly of the single tool box and having its forward end secured to the single tool box to stabilize the same.

5. In a pick-up truck, a box like truck body and a cab at the forward end of the truck body, the improvement comprising a storage tank in the truck body immediately rearwardly of the cab and extending transversely of the truck body and having ends spaced from the side walls of the truck body, auxiliary tanks in the truck body adjacent the opposite ends of the storage tank and between such ends and the side walls of the truck body, side rail assemblies on the tops of the truck body side walls and anchored thereto, and a transverse vertical guard rack rearwardly of the cab and having its opposite ends secured to said side walls and also secured to the forward ends of said side rail assemblies.

6. The structure of claim 5 and said auxiliary tanks having rear sloping end walls interfitting with projecting wheel wells on the truck body.

7. The structure of claim 5 and a detachable top extension on said guard rack to increase the height of the guard rack.

References Cited
UNITED STATES PATENTS

| | | | |
|---|---|---|---|
| 2,504,222 | 4/1950 | Otto | 296—24 R |
| 3,245,713 | 4/1966 | Ogilvie | 296—24 R |

ROBERT G. SHERIDAN, Primary Examiner

U.S. Cl. X.R.

224—42.42 R; 280—5 A; 296—28 M